(12) United States Patent
Tame

(10) Patent No.: US 7,789,302 B2
(45) Date of Patent: Sep. 7, 2010

(54) TRANSFER OF VERIFICATION DATA

(75) Inventor: Gavin Randall Tame, Pretoria (ZA)

(73) Assignee: Dexrad (Proprietary) Limited (ZA)

( * ) Notice: Subject to any disclaimer, the term of this patent is extended or adjusted under 35 U.S.C. 154(b) by 1623 days.

(21) Appl. No.: 10/344,793

(22) PCT Filed: Aug. 17, 2001

(86) PCT No.: PCT/IB01/01481

§ 371 (c)(1),
(2), (4) Date: Jun. 17, 2003

(87) PCT Pub. No.: WO02/15117

PCT Pub. Date: Feb. 21, 2002

(65) Prior Publication Data

US 2004/0026502 A1 Feb. 12, 2004

(30) Foreign Application Priority Data

Aug. 17, 2000 (ZA) ..................................... 00/4221

(51) Int. Cl.
*G06K 5/00* (2006.01)
(52) U.S. Cl. ...................................................... 235/382
(58) Field of Classification Search ................ 235/382, 235/492, 487
See application file for complete search history.

(56) References Cited

U.S. PATENT DOCUMENTS

| | | | |
|---|---|---|---|
| 3,859,508 A * | 1/1975 | Brosow et al. | 235/380 |
| 4,855,578 A | 8/1989 | Hirokawa et al. | |
| 5,162,638 A | 11/1992 | Diehl et al. | |
| 5,288,979 A * | 2/1994 | Kreft | 235/380 |
| 5,408,633 A * | 4/1995 | Katsumura et al. | 711/115 |
| 5,434,395 A * | 7/1995 | Storck et al. | 235/380 |
| 5,768,143 A | 6/1998 | Fujimoto | |
| 6,073,855 A * | 6/2000 | MacKenthun | 235/492 |
| 6,298,441 B1 * | 10/2001 | Handelman et al. | 713/185 |
| 6,336,585 B1 * | 1/2002 | Harada | 235/380 |
| 6,339,638 B1 * | 1/2002 | Ohki et al. | 379/91.01 |
| 6,394,343 B1 * | 5/2002 | Berg et al. | 235/379 |
| 6,454,164 B1 * | 9/2002 | Wakabayashi et al. | 235/380 |
| 6,824,063 B1 * | 11/2004 | Wallace et al. | 235/487 |
| 6,934,855 B1 * | 8/2005 | Kipnis et al. | 726/20 |
| 7,043,642 B1 * | 5/2006 | Lisimaque | 713/189 |

FOREIGN PATENT DOCUMENTS

| | | |
|---|---|---|
| EP | 0103759 | 3/1984 |
| EP | 0224147 | 6/1987 |
| FR | 2771528 | 5/1999 |
| WO | WO 94/16415 | 7/1994 |

* cited by examiner

*Primary Examiner*—Seung H Lee
(74) *Attorney, Agent, or Firm*—Jennifer E. Lacroix, Esq.; DLA Piper LLP (US)

(57) ABSTRACT

A method and system are provided for transferring verification data from a first carrier to at least a second carrier in a secure manner. A first carrier, which is typically a smart card based ID card, contains verification data to identify the card holder securely. The method of the invention verifies the verification data on the ID smart card, reads the verification data, compresses and encrypts it, and writes it onto a second carrier, which may be a second smart card or a printed document, for example, in a machine readable form. The invention permits verification data to be securely transferred from one carrier to another, which permits a high degree of security in numerous applications such as the issuing of bank cards, medical aid claims, and other valuable documents.

21 Claims, 4 Drawing Sheets

TRANSFER OF VERIFICATION DATA

BACKGROUND OF THE INVENTION

This invention relates to a method of and a system for transferring verification data securely.

Smart cards are becoming increasingly popular due to their ability to carry large amounts of portable data in a secure and compact manner.

Verification and identification issues have become increasingly important in smart card technology, in particular as regards combating fraud. Most users are still more comfortable with paper-based documentation and the standard verification methods associated with such documentation, to the extent that certain documentation will probably never be replaced by electronic forms.

Another problem associated with smart card technology is that the holder of the smart card has possession of the card, which means that institutions such as banks only have access to verification data on presentation of the smart card. In many cases, this will hamper the ability of an institution to regularly access secure data.

In many countries, multi-functional smart card technology has now been accepted for use with identity documents and cards. It is an object of this invention to allow ready integration of such identity cards with other portable data file technologies, as well as with paper-based documentation.

SUMMARY OF THE INVENTION

In broad terms, the invention is directed towards a method of transferring verification data from a first carrier to at least a second carrier in a secure manner so that data on the second carrier is independently verifiable.

More particularly, a first aspect of the invention provides a method of transferring verification data from a first carrier to a second carrier, the method comprising the steps of:

verifying the verification data on the first carrier;
reading the verification data;
securing the verification data; and
writing the verification data to the second carrier in a machine readable format.

In a preferred form of the invention, the method includes the further steps of controlling access to the verification data written to the second carrier, reading the verification data, and verifying the read data.

The first carrier is preferably a portable data storage device such as a first smart card.

The second carrier may similarly be a portable data storage device in the form of a second smart card.

Alternatively, the second carrier may comprise a document to which the verification data is applied in a machine readable format, for example by printing.

The first carrier may be an identity-based carrier associated with an individual, and the step of verifying the verification data may comprise the steps of controlling access to the first carrier by verifying the identity and/or credentials of an operator designated to implement at least the reading step, and verifying the identity of the holder of the first carrier.

The operator and holder verification steps may comprise PIN/password and/or biometrically-based verification procedures.

The PIN/password and biometrically-based procedures are preferably used in conjunction with one another in a matching procedure.

The securing step may include the steps of adding additional security data to the verification data and compressing and encrypting the combined security and verification data.

The step of controlling access to the written verification data on the second carder is preferably substantially identical to the corresponding access control step in respect of the first carrier.

Similarly, the step of verifying the read data on the second carrier may be substantially identical to the corresponding verification step with respect to the first carrier.

The method may include the still further steps of reading the verification data from the second carrier and writing the verification data to a third carrier in machine readable format.

The second carrier is typically a document to which the verification data is applied in machine readable format, and the third carrier is typically a portable data storage device such as a smart card.

Alternatively, the second carrier may a portable data storage device and the third carrier may be a document to which the verification data is applied in machine readable format.

The invention can thus provide for the secure transfer of verification data from a first carrier to an $n^{th}$ carrier via n−2 carriers, wherein each intermediate data transfer step is secured.

The invention extends to a system for transferring verification data from a first carrier to at least a second carrier in a secure manner, the system including means for verifying the verification data on the first carrier, means for reading the verification data, means for securing the verification data, and means for writing the verification data to a second carrier in a machine readable format.

Preferably, the system further includes means for controlling access to the verification data on the second carrier, means for reading the verification data on the second carrier, and means for verifying read verification data on the second carrier.

The securing means typically includes encrypting and decrypting means as well as compressing and decompressing means for compressing, encrypting, decrypting and decompressing the verification data.

DESCRIPTION OF EMBODIMENTS

The invention will now be described by way of three embodiments which illustrate various possible applications thereof. The first embodiment applies to the issuing of a second smart card, typically by a bank or other financial institution, to the holder of a first smart card, which is typically an identity card.

Figure 1:
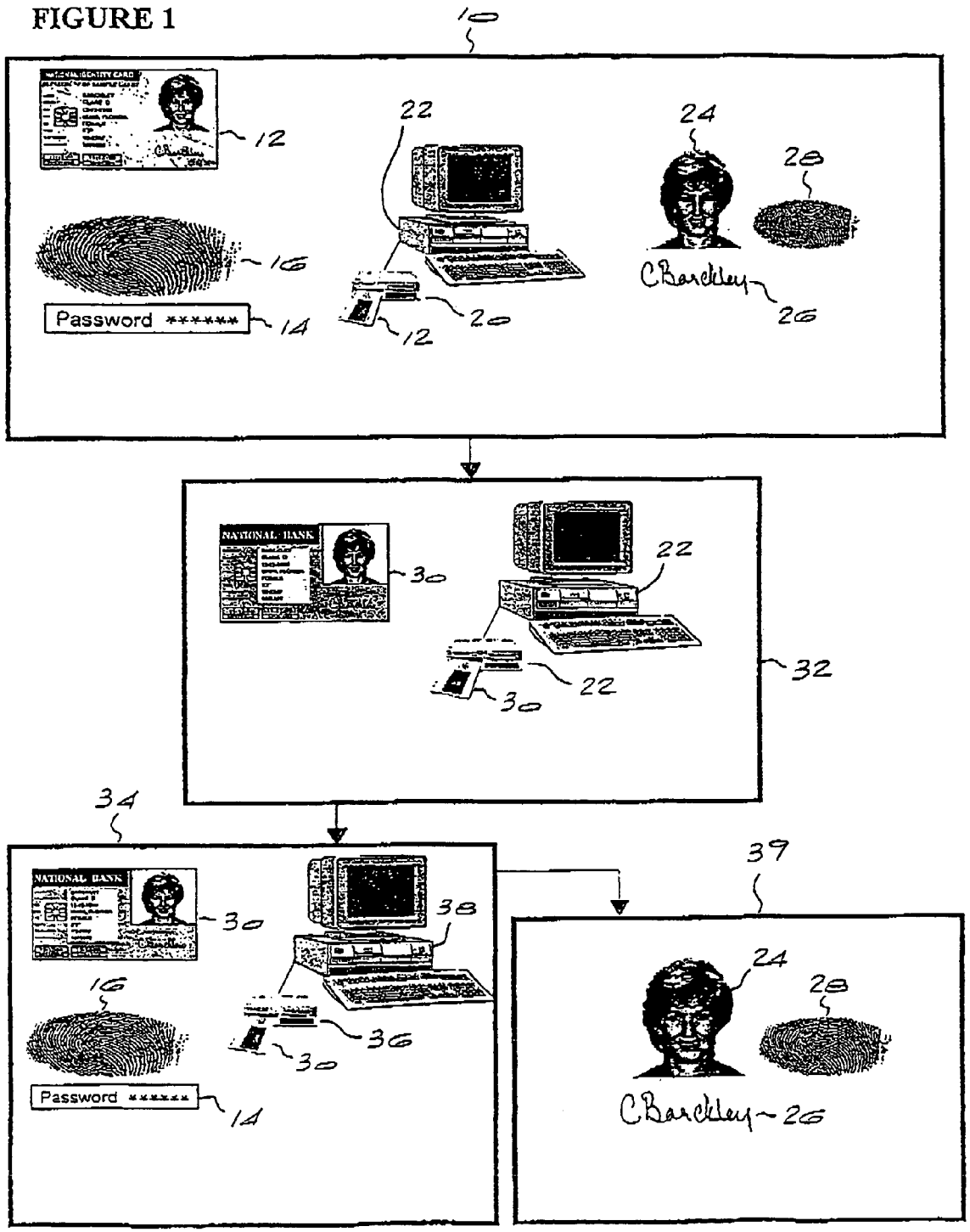
FIG. 1 shows a schematic flowchart of a first embodiment of a method of transferring verification data from a first smart card to a second smart card.

Referring first to FIG. 1, a first series of operator access control, cardholder identification and smart card reading steps are illustrated schematically in block 10. A first smart card in the form of a national identity card 12 is presented to an operator of an institution such as a bank. In the first access control step, verification of the operator is required. This may be achieved in a number of ways, either verifying the PIN code or password 14 of the operator or by matching the fingerprint 16 of the operator using finger biometrics. Naturally, the PIN code is not as secure as the fingerprint matching method as it does not ensure the identity of the operator. As is well known, a third party can obtain a PIN code in various ways, so that biometrics are preferred.

Three alternative methods have been developed to verify the finger biometrics of the operator. In the first method, known as the "password-controlled one-to-one match" method, the operator enters the password 14 into a computer and then places his or her finger on the fingerprint scanner. The password serves as a search key to the database record which holds the finger biometrics of the operator and the biometric data derived from the live finger scan is compared to the data retrieved from the database record.

In the second method, known as the "card-to-live scan finger-matching" method, the operator is provided with an access card. This card is either in the form of a smart card or a card with a two dimensional bar code having fingerprint biometrics incorporated in the machine readable data of the card. To obtain access, the finger biometric data obtained from the card is compared with that derived from the live finger scan.

The third method to identify the finger biometrics involves a one-to-many finger matching method. This method is similar to the manner in which a number of automatic fingerprint identification systems work. A live finger scan is compared with many fingerprints registered on a database. If a match occurs, access is granted. As many database records have to be searched, the fingerprint patterns are usually classified so as to cut down on search time. This method is typically only really practical with 150 registered operators or fewer. An alternative to this is using fingerprint scanners which have firmware within the scanner which can match a live biometric scan to many biometrics which are stored in memory within the scanner device.

Once the fingerprint 16 and/or password 14 of the operator are matched, the data from the operator database is logged at the computer. This logged data is normally added to the data read from the smart card 12 for portable accountability purposes. Once positive operator verification and identification has taken place, the smart card 12 is placed in the smart card reader 20 connected to a PC 22. Instead of a conventional desk top PC, a laptop/notebook PC, or other portable computing device could be used. A secret public key code required to access the data of the smart card is used secretly by the program to gain access to the user smart card data, as well as to decrypt the verification data, together with other forms of data.

The next step in the verification process is to verify the identity of the cardholder. The nature of the identity verification process depends on what verification data is available on the smart card 12. In cases where the smart card simply has a holder PIN code or password, the operator or preferably the cardholder enters the PIN code on the keyboard of the PC, which PIN code will then be verified. Preferably, the smart card has a digitized facial image and/or digitized signature image. In this case, these will be displayed on the monitor of the PC 22, and the identity of the cardholder will be visually confirmed by the operator. If fingerprint biometrics are available in the verification data, these can be matched with a live finger scan 28 of the cardholder. In this case verification takes place automatically rather than by visual matching by the operator, as was the case with the facial image 24 and signature image 26.

Only in the event of both operator and cardholder verification will the verification be processed for rewriting to a second smart card 30, as is indicated schematically at 32. Additional data is now added to the data set which needs to be written to the second smart card 30. This data includes the details of the operator and possible additional verification details derived from other documentation which the institution may require. These could be monetary amounts, duration and expiry dates, guarantee details and so on. Transaction time stamps may also be appended to the data.

The data read from the first smart card together with the additional captured data is now compressed by various compression techniques. In the case of digital image compression, a lossy compression technology is used. This can either be based on fractal or a wavelet image compression. Both of these techniques compress the image by filtering out the less relevant image information which is less critical to the human visual identification process. If the data is non-image based, a lossless compression is used. In this type of compression which is based on arithmetic encoding, no data is discarded. Arithmetic encoding provides the highest compression ratios, but is one of the slowest lossless compression technologies. As the data sets are not particularly large this compression technology is the most suitable. Different data elements may be compressed using different encryptions. After being compressed, the data is then re-encrypted, with the private key of the institution (in this case the bank) being secretly used by the program to re-encrypt the data.

A private/public key encryption scheme is used. The private key can only encrypt, and is never known by any operator. The public key is only capable of decrypting the data. The public key can be distributed for decryption in many locations, with the private/public encryption being based on RSA encryption. Both of the private and public keys are usually acquired from digital certificates, which supply these keys when they are prompted with the correct passwords. Below the private/public key layer are another two layers of encryption. The one layer generates unique keys from the uniqueness of the data of the data set of each card. The other layer merely scrambles the data using a number of scrambling algorithms.

For additional security, technology has been developed around the HASP "dongle" of Aladdin company. This is a highly secure device which is attached to the parallel, USB or serial port of the PC, and is used to hold the digital certificate which supplies the secret private and public keys for the encryption and decryption of data. An additional alternative is another Aladdin company product known as an "E-Token" which is a device which attaches to a USB port of a PC and which was developed specifically for the purpose of supplying passwords, keys and digital certificates for digital signatures and public key infrastructure encryption. Additional scrambled codes, together with operator log data are also stored on the dongle. A further use of the HASP dongle is to protect the executable programs from being viewed or tampered with, copied or being run on any other machine other than the one which they are registered for. This is achieved by the combination of secret seed codes on the dongle and executable program enveloping software.

Referring back to the card writing step illustrated schematically at 32, the second smart card 30 is now inserted into the smart card reader 20. Before the data can be written to the smart card 20, a further smart card private key access is secretly passed by the program. Once the data has been written to the smart card 30, the bank or other institution now has verification features originally carried on the first national identity smart card 12 captured on the second smart card 30, as well as any other data which the institution may require to be combined with the acquired verification features. Additional details from other institutions may also be written onto this second card.

The next stage in the transfer procedure is the verification stage of the bank's own smart card 30, in which the data which was acquired from the first smart card and written to the second smart card is accessed and used. This process is indicated schematically in block 34. The smart card 30 is placed in a smart card reader 36 which is connected to a PC 38. Again the operator needs to comply with the operator verification/access control procedures described above with reference to block 10. After positive operator identification and verification, the public access code is secretly passed to the smart card 30 so that data can be read from the smart card. Once acquired, the data is then decrypted by virtue of the program secretly passing a password to the digital certificate which issues the private key for the decryption of the data. Once it Is decrypted, each data type, either image-based or non-image based, is decompressed. The decompressed decrypted data is then displayed on the monitor of the PC, as is shown at 39, so that the operator can verify the identify of the cardholder 24. In the case of finger biometrics, the cardholder places a finger on the finger scanner, as is indicated at 28, and the derived biometric data is compared in a one-to-one match with that acquired from the smart card, with the verification taking place automatically. The result of the verification together with the details of the operator can be logged for accountability purposes.

Figure 2:
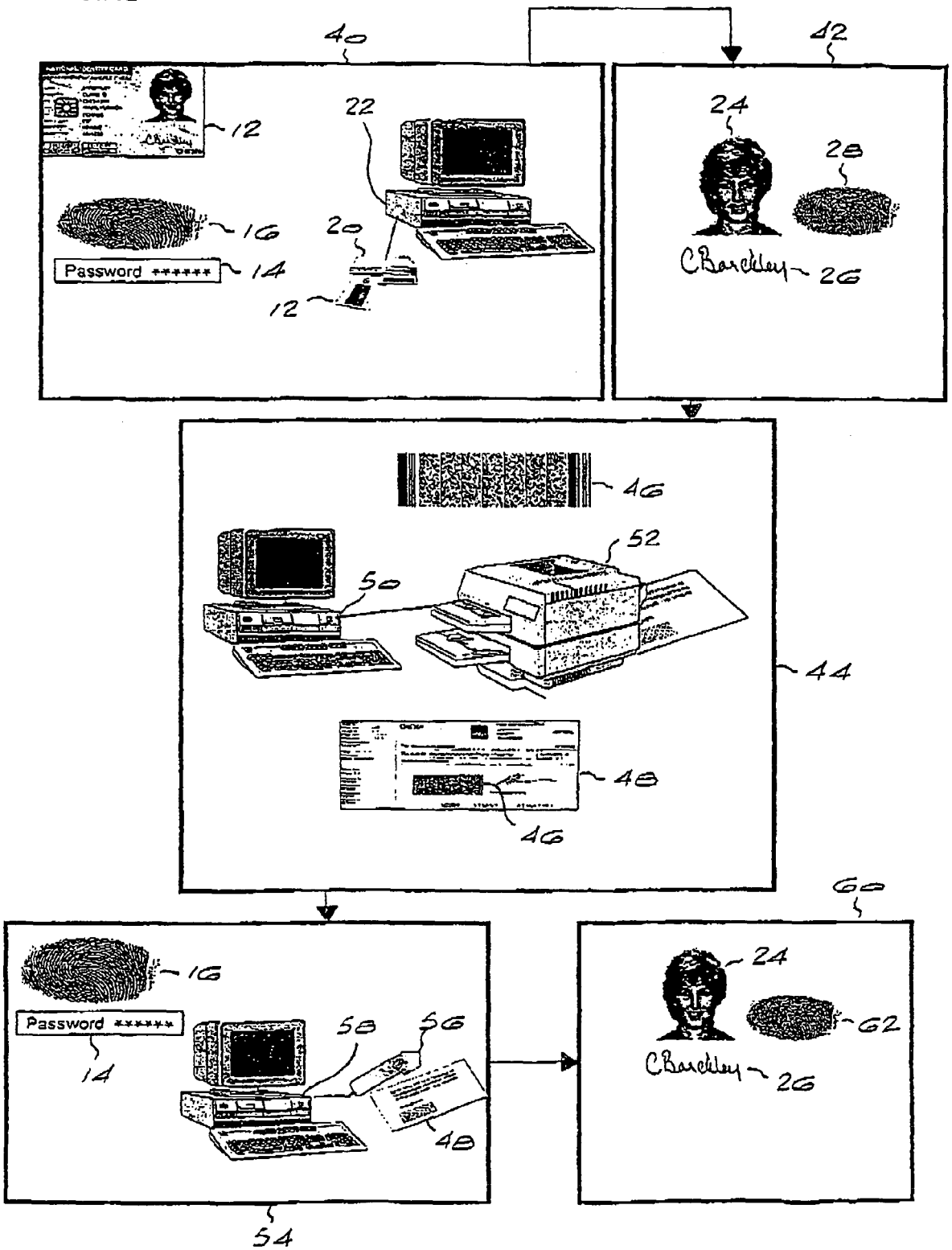
FIG. 2 shows a schematic flowchart of a second embodiment of a method of transferring verification data from a first smart card to a document.

Referring now to FIG. 2, a second embodiment of a verification data transfer method is shown. The first steps of operator access control, reading of the smart card and verification and identification of the cardholder are identical to those illustrated in FIG. 1, as is shown in blocks 40 and 42 respectively. In block 44, the verification data together with any additional data such as that referred to previously with reference to FIG. 1 is compressed and encrypted in the same manner as was described with reference to FIG. 1. This data is then encoded into a two dimensional symbol or barcode 46. The two dimensional barcode has Reed-Solomon error correction which allows for full recovery in the event of partial destruction of the symbol. The two dimensional symbol may either be an image based on two dimensional symbology or a font based on such symbology. Commercially available image-based two dimensional symbologies may be used, including PDF417, Supercode, Aztec QR code and Datamatrix.

It will be appreciated that such two dimensional symbols are not limited to conventional printing techniques, and can, for example, be etched into metal surfaces, laser engraved or applied to surfaces in a number of other ways. The use of other multi-dimensional machine readable code forms such as stacked barcodes or matrix barcodes is also possible.

The applicant has also developed a font-based two dimensional symbology which can be sent to a printer in text form based on a particular font set. A specifically designed True Type font line interprets the text code. This type of two dimensional symbology may be used for mass printing where image-based symbols require excessive memory and tend to slow down high-speed production processes. This means that verification data which is obtained from smart cards may be used at mass printing institutions where the data is incorporated in mass high-speed printed two dimensional bar codes.

The applicant has also developed two-dimensional symbology which cannot be copied, and which forms the subject of International patent application no. PCT/IB-01/00362. This provides extra protection to the verification data within the two dimensional barcode or symbol 46 on printed documents as it prevents such symbols from being copied.

The data acquired from the verification smart card is encoded in one of the above-mentioned two dimensional symbols 46 which is then printed on a document 48 such as a cheque. If the document is an electronic document the acquired data is electronically appended to the document in a PC 50 and then printed via a printer 52. Alternatively, if the document is non-electronic, it is placed in the printer 52 so that the symbol 46 may be printed on it. A label having the symbol printed on it can also be attached to the document Non-removable labels of the type manufactured by the 3M Company are preferred. A label is sometimes easier to print and to attach to the document, especially if one wants to verify a preexisting document. This would be analogous to having a paper document electronically signed. The verification data acquired from the verification smart card can be combined with additional data which is derived from the document itself, such as amounts or dates appearing on the document, which is then included in the data contained in the two dimensional symbol on the document.

Referring now to block 54, a verification process takes place in which the verification details of the operator are scanned in using a hand-held scanner 56, are decoded at a PC 58 and are verified, using password and fingerprint biometrics identification means 14 and 16 respectively, as was described previously with reference to block 34 of FIG. 1.

The scanner 56 may be either a laser or a linear CCD two-dimensional scanner, an image-based two-dimensional scanner, or a flat bed scanner. If the symbol is of a non-reproducible type, a specific scanner which is capable of reading this form of symbol needs to be used, with the scanner being capable of separating the symbol from the protective layer during the scanning process.

The data may be decoded by the scanning device 56 and sent to the PC 58 (or other computing device) via the serial port Alternatively, the image of the symbol is "frame grabbed" or scanned by a flat bed scanner and decoded by the host PC 58. The decoded data is decrypted using a public key which is secretly passed by the system, and the data is then decompressed, as is indicated in block 60. The decoded and decompressed data is displayed on the monitor of the host PC 58 for operator verification or automatic verification by finger biometrics by matching a live finger scan from the cardholder against the decrypted finger scan 62 obtained from the data acquired from the two dimensional symbol 46.

Verification data can be stored for later verification and analysis, and the computer 58 can also automatically verify various forms of verification data, such as the ID number of the cardholder. Automated verification can take place by scanning the documents in a batch process using flat bed scanners equipped with a document feeder.

Figure 3:
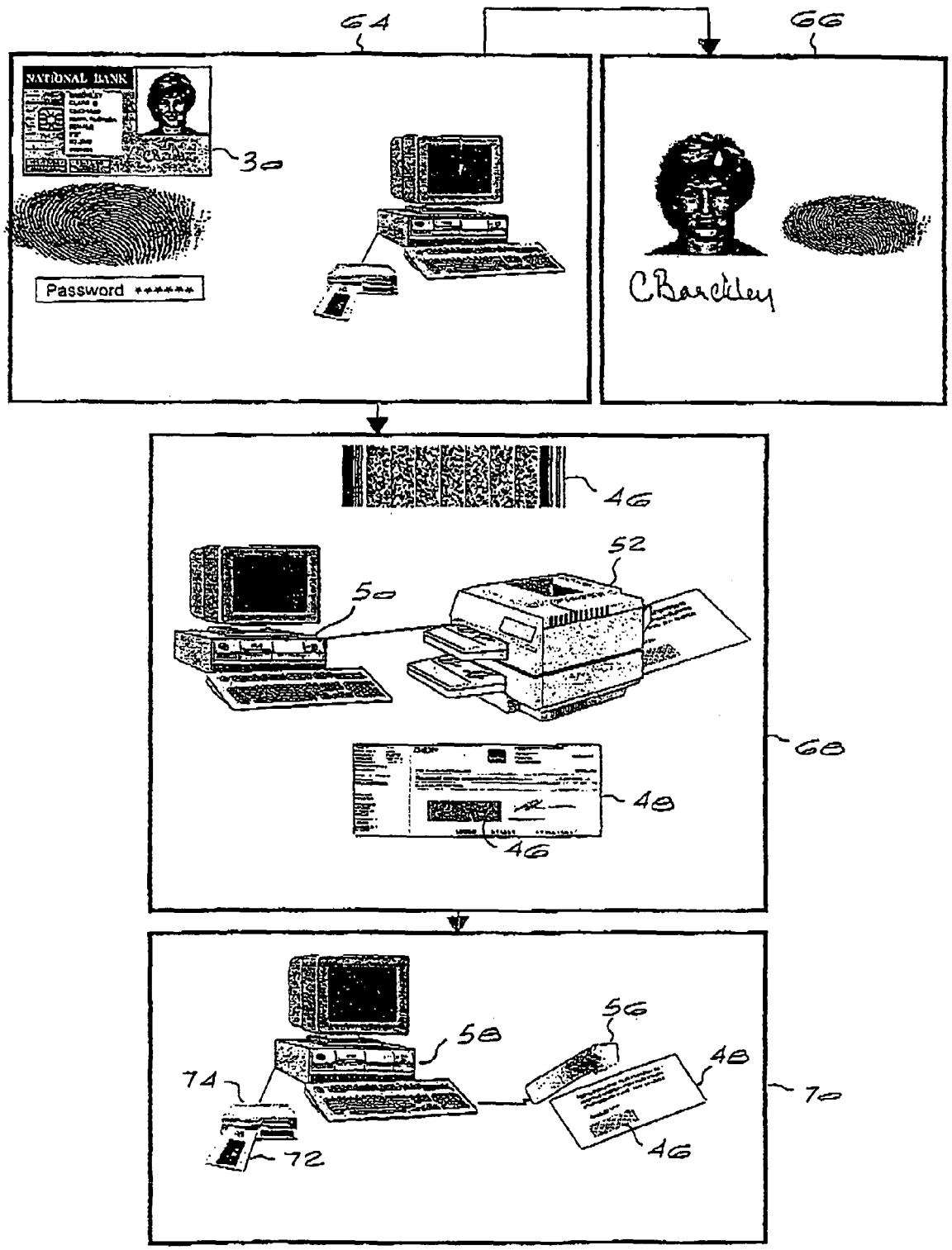
FIG. 3 shows a schematic flowchart of a third embodiment of a method of transferring verification data in which the data is transferred from a first smart card to a second smart card via a secured document.

Referring now to FIG. 3, a third embodiment of a verification data transfer method is shown. The initial access control and card read step indicated at block 64 and the cardholder verification and identification step shown in block 66 is essentially identical to the corresponding initial steps of FIGS. 1 and 2. Similarly, the two dimensional symbol encoding and printing step indicated in block 68 is identical to the corresponding step shown in block 44 in FIG. 2. Block 70 shows the subsequent steps in which the two dimensional symbol 46 is scanned and written to a third smart card 72. In this step, the two dimensional symbol 46 on the document 48 is scanned using the scanner 56, as is described above with reference to block 54 of FIG. 2. The scanned data is subsequently written to the third smart card 72 via a card reader/writer 74 using exactly the same procedure that was described with reference to block 32 of FIG. 1. The third smart card is subsequently read, the data is processed and the verification and identification of the cardholder takes place in exactly the same manner as was described with reference to blocks 34 and 38 of FIG. 1.

Figure 4:
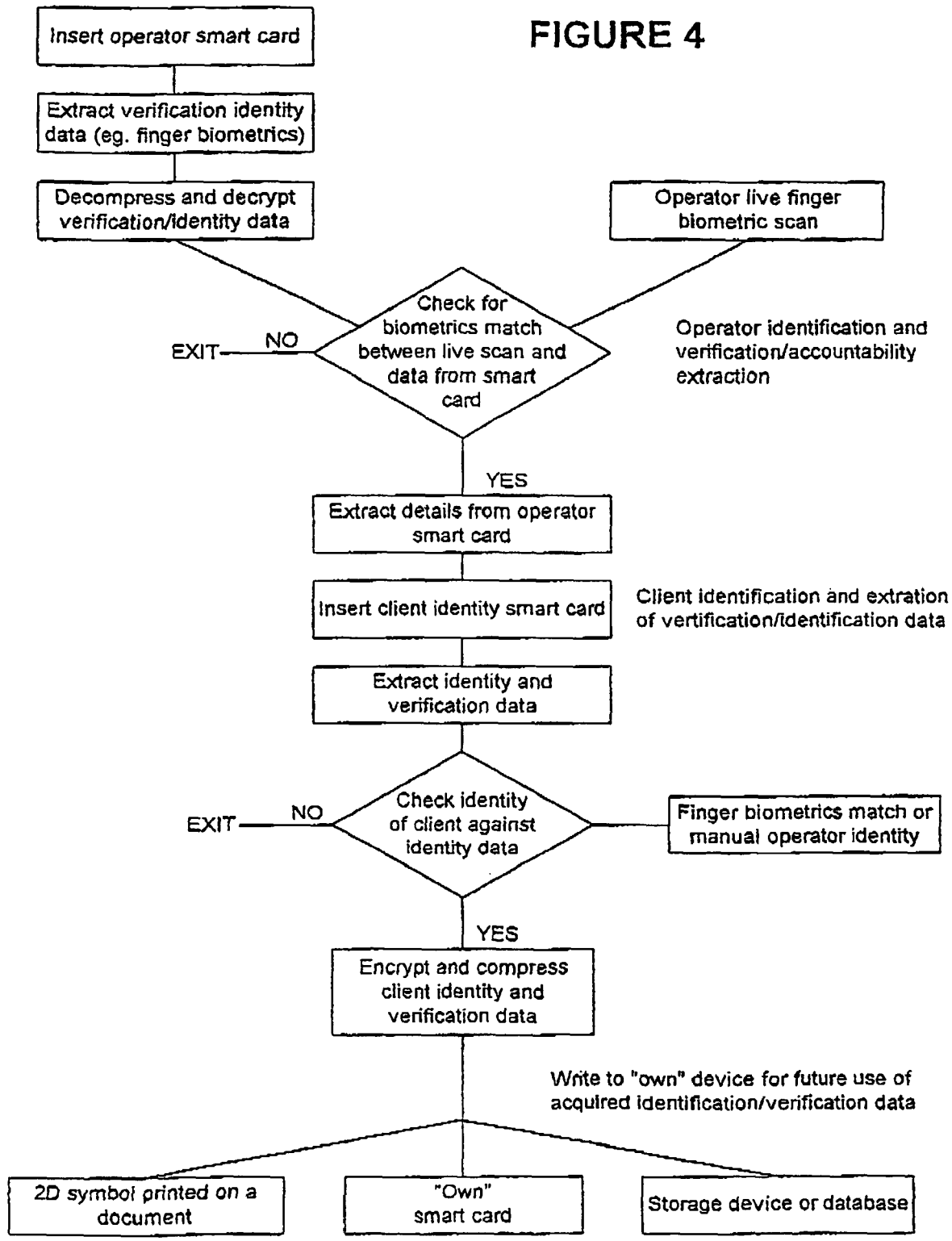
FIG. 4 is a conventional flowchart summarising major steps of the method.

The flowchart of FIG. 4 summarises the major steps of the basic method.

The invention will now be described with reference to two specific "real life" applications.

The dramatic increase in vehicle thefts and hijackings has resulted in a world-wide demand for counter-measures. The invention described in this application can serve as an extremely useful and cost-effective guard against vehicle theft This application also demonstrates the effective use of this invention with the proposed new South African smart card identity card.

On application for vehicle registration, the applicant's identity card is presented to the operator. The identity card in this case is a smart card which contains identity data and verification data. The operator inserts the identity smart card into the card reader and gains access control via a finger biometrics verification process. The verification data is read from the smart card. The applicant places his/her finger on a finger scanner and his/her biometric data is matched to that acquired from the identity card. It has now been certified that the person is indeed the owner of the card. The personal details which were acquired from the card are now checked against the on-line vehicle ownership database in order to ensure that the cardholder is the true owner of the vehicle. The operator details, vehicle registration details and the verification details obtained form the card are compressed and encrypted. The data is then encoded into a two dimensional symbol and printed on a pre-printed licence disk blank. In this case the pre-printed licence disk allows for the creation of a non-reproducible two-dimensional symbol. The licence disk now carries all the identity card details of the applicant in a machine-readable form on the vehicle licence disk. There can be no collusion between the operator and the applicant and in effect the license disk is now carrying a highly secure copy of the applicant's identity document with it.

The invention also finds useful application in medical aid systems, i.e. systems or schemes for assisting members to pay for medical treatment (such schemes are known in the USA as traditional indemnity health insurance plans). A smart card serves as an extremely useful and secure medical aid card, especially since the person presenting the card can be verified as the true owner of the card. Other uses are the secure writing of diagnoses, prescriptions and doctors' certificates on the smart card. Medical aid funds and similar institutions do not have a national identity infrastructure which affords them the ability to create smart cards with positive identity features on them. It will be highly convenient and cost effective to be able to obtain this verification data from the national identity smart card.

Another problem with existing medical aid cards is the fact that the verification takes placed at the doctor's consulting rooms or hospital and not at the medical aid provider itself. The medical aid provider can thus never be certain whether verification did indeed take place. The medical aid institution can not be sure if the consultation claimed for did indeed take place.

In this application, the verification data is read from the national identity card to the medical aid smart card (or a medical aid card with a two-dimensional bar code). The medical aid card will now have the verification features of a national identity card. When the medical aid smart card is presented to a doctor or hospital, the patient can be identified and verified. The positive verification proof, the verification data from the smart card, the doctor's diagnosis, prescription and certificate details is then compressed and encrypted and printed on a medical aid claim form in the form of a two dimensional symbol. This claim becomes a secure claim form which cannot be altered, tampered with or fraudulently created, and can now be posted safely to the medical aid provider. The installation at the medical aid provider scans and decodes the claim form, analyses and verifies the patient according to the verification data, and automatically processes the claim form.

The invention greatly enhances the scope of smart card technology, especially from a security and verification point of view. It also effectively integrates smart card technology with paper documentation. The invention also results in significant cost savings as the verification features provided by smart card identification can effectively be used by many institutions without them needing the infrastructure to create these secure verification features. The expense of a secure national identity system (this is significant if one considers the costs of a large national "automatic finder identification system", which is necessary to avoid duplicate applications by a single person) is justified when the use of the card can be so dramatically enhanced.

The invention has specific use in the area of processing official and business applications and the like. The size of this area is only exceeded by its diversity. Practically all applications require proof of identity. Currently the ID book of the applicant is requested and a photocopy is made. This is a highly insecure practice and will not be particularly effective with the new smart card identity card as most of the details are incorporated on the chip of the card. For all types of application the verification details will be encoded into a two dimensional symbol and printed on the relevant application form. The application form is now permanently attached to the applicant with verifiable proof. The details read from the smart card can be used automatically to fill in the personal details of the applicant. The data within the two dimensional symbol can also be scanned later so that the application can be automatically processed.

A few of the main examples in which the invention will prove to be effective in combating document fraud by providing a suitable verification method include contractual documents, insurance documents, certificates and claims, medical and hospital registration documents, medical aid cards, medical claim forms, doctors' certificates and prescriptions, and banking documents, including personnel information forms and application forms for accounts, loans and mortgage bonds. Other areas of application include personal information documents and applications, employment and account application forms and questionnaires, together with government-based forms such census forms, ballot forms, applications for registration on the voters' roil, and various forms of licences, such as TV, trading and weapon licences. In the field of education, documents such as examination papers, student application forms and cards and diploma certificates are applicable to the invention. Vehicle-related documents, such as vehicle registration papers and windscreen licence disks, can also benefit from the invention, together with all types of negotiable instruments, including cheques and promissory notes, vouchers and tickets.

The above examples are given by way of illustration and are not intended to be exhaustive or limiting.

What is claimed is:

1. A method of transferring verification data from a first carrier to a second carrier, the method comprising the steps of:
    placing the first carrier in a reader connected to a computing device; and
    operating the computing device to perform steps of:
        verifying the verification data on the first carrier;
        reading the verification data;
        securing the verification data; and
        writing the verification data to the second carrier in a machine readable format;
    wherein the step of verifying the verification data includes the steps of controlling access to the first carrier by verifying the credentials of an operator designated to implement at least the reading step and verifying the identity of the holder of the first carrier, where said operator and said holder are separate from one another, and where the operator and holder verification steps each comprise at least one of a PIN code, a password, or a biometrically-based verification procedure.

2. A method according to claim 1 including the further steps of controlling access to the verification data written to the second carrier, reading the verification data and verifying the read data.

3. A method according to claim 2 wherein the step of controlling access to the written verification data on the second carrier is substantially identical to the corresponding access control step in respect of the first carrier.

4. A method according to claim 2 wherein the step of verifying the read data on the second carrier is substantially identical to the corresponding verification step with respect to the first carrier.

5. A method according to claim 2 including the still further steps of reading the verification data from the second carrier and writing the verification data to a third carrier in machine readable format.

6. A method according to claim 5 wherein the second carrier is a document to which the verification data is applied in machine readable format, and the third carrier is a portable date storage device.

7. A method according to claim 6 wherein the third carrier is a smart card.

8. A method according to claim 5 wherein the second carrier is a portable data storage device and the third carrier is a document to which the verification data is applied in machine readable format.

9. A method according to claim 1 wherein the first carrier is a portable data storage device.

10. A method according to claim 9 wherein the first carrier is a first smart card.

11. A method according to claim 1 wherein the second carrier is a portable data storage device.

12. A method according to claim 11 wherein the second carrier is a second smart card.

13. A method according to claim 11 wherein the second carrier comprises a document to which the verification data is applied in a machine readable format.

14. A method according to claim 1 wherein the first carrier is an identity-based carrier associated with an individual.

15. A method according to claim 1 wherein the PIN code or password and the biometrically-based verification procedures are used in conjunction with one another in a matching procedure.

16. A method according to claim 1 wherein the securing step includes the steps of adding additional security data to the verification data and compressing and encrypting the combined security and verification data.

17. A method according to claim 1 which provides for the secure transfer of verification data from a first carrier to an $n^{th}$ carrier via n−2 carriers, wherein each intermediate data transfer step is secured.

18. A system for transferring verification data from a first carrier to at least a second carrier in a secure manner, the system including means for verifying the verification data on the first carrier, means for reading the verification data, means for securing the verification data, and means for writing the verification date to a second carrier in a machine readable format, said means for verifying the verification data including means for controlling access to the first carrier by verifying the credentials of an operator designated to implement at least the reading of the verification data and the identity of the holder of the first carrier, where the operator and holder are separate from one another, and where verifying the credentials of an operator and the identity of the holder of the first carrier each comprise at least one of a PIN code, a password, or a biometrically-based verification procedure.

19. A system according to claim 18 further including means for controlling access to the verification data on the second carrier, means for reading the verification data on the second carrier, and means for verifying read verification data on the second carrier.

20. A system according to claim 19 wherein the securing means includes encrypting and decrypting means as well as compressing and decompressing means for compressing, encrypting, decrypting and decompressing the verification data.

21. A system according to claim 18 wherein the first carrier is an identity-based carrier associated with an individual.

* * * * *